US005481715A

United States Patent [19]

Hamilton et al.

[11] Patent Number: 5,481,715
[45] Date of Patent: Jan. 2, 1996

[54] METHOD AND APPARATUS FOR DELEGATED COMMUNICATIONS IN A COMPUTER SYSTEM USING TRUSTED DEPUTIES

[75] Inventors: Graham Hamilton; Robert B. Hagmann, both of Palo Alto, Calif.

[73] Assignee: Sun Microsystems, Inc., Mountain View, Calif.

[21] Appl. No.: 167,496

[22] Filed: Dec. 15, 1993

[51] Int. Cl.$^6$ .................................................. G06F 13/00
[52] U.S. Cl. .................................. 395/700; 364/DIG. 1; 364/280.6; 364/284.4
[58] Field of Search ...................... 395/700; 364/DIG. 1, 364/286.4, 286.5

[56] References Cited

U.S. PATENT DOCUMENTS

| | | | |
|---|---|---|---|
| 5,173,939 | 12/1992 | Abadi et al. | 380/25 |
| 5,224,163 | 6/1993 | Gasser et al. | 380/30 |
| 5,268,962 | 12/1993 | Abadi et al. | 380/21 |
| 5,311,591 | 5/1994 | Fischer | 380/4 |
| 5,315,657 | 5/1994 | Abadi et al. | 380/25 |

OTHER PUBLICATIONS

"Authentication in Distributed Systems: Theory and Practice" by Bruce Lampson et al., ACM Transactions on Computer Systems, vol. 10, No. 4, Nov. 1992, pp. 265–310.

*Primary Examiner*—Thomas M. Heckler
*Attorney, Agent, or Firm*—Erwin J. Basinski

[57] ABSTRACT

An apparatus and a method are disclosed whereby a client application can use a trusted "Deputy" application to execute operation calls on several servers on behalf of the client, the Deputy application being able to convince the servers that the deputy application is representing the original client application, and the client thereby reducing the risk of being contaminated by uncontrolled access to an unknown server, while at the same time being able to obtain the desired processing results regardless of the number or location of servers involved in providing the results. The Deputy application is authenticated by the server as representing a user, not a user on a predetermined workstation or as a predetermined member of a particular work group.

28 Claims, 12 Drawing Sheets

Distributed Computer System

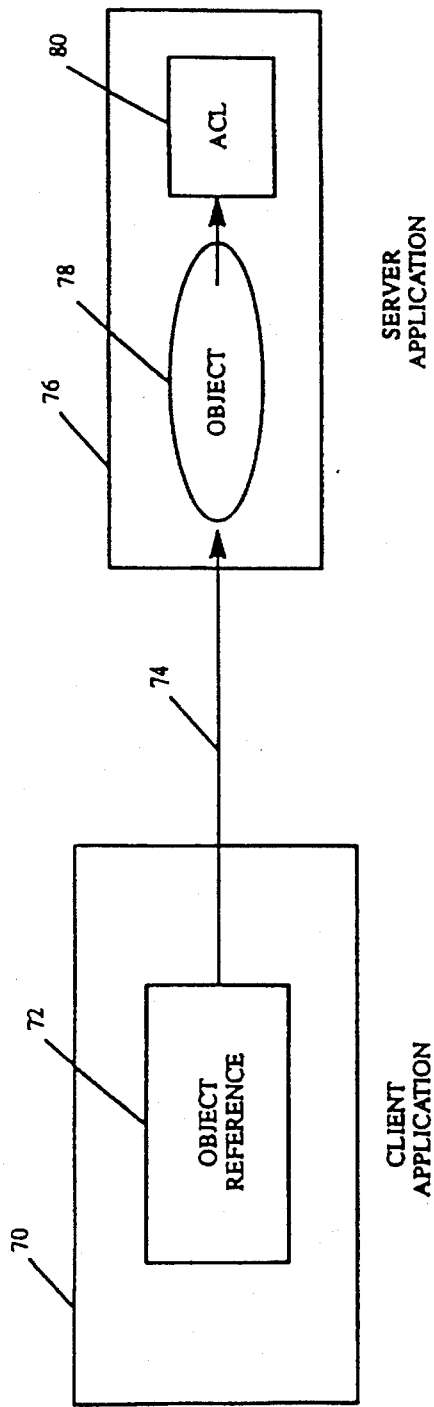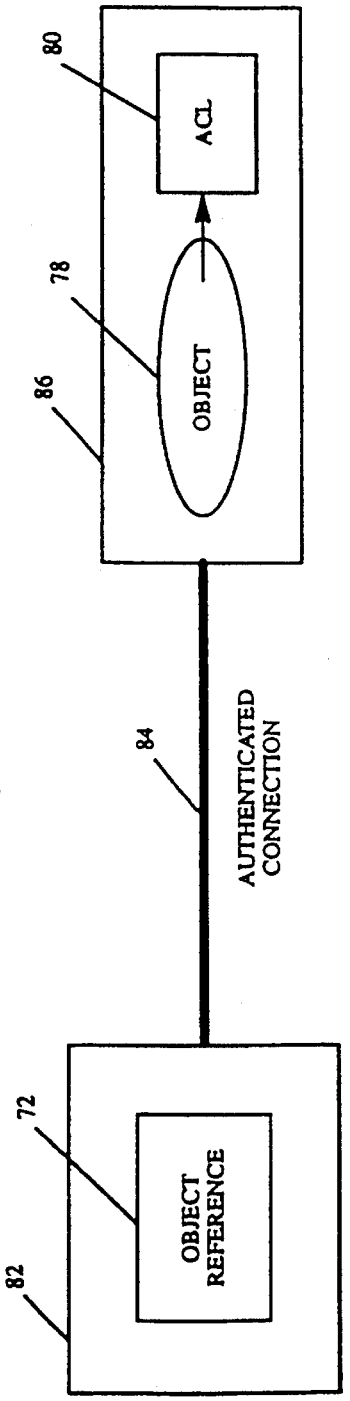
A DOE Object and Object Reference
Figure 5
PRIOR ART
A Secure Object
Figure 6
PRIOR ART

A Compound Document

Target Object Reference

A Deputy Talking to a Compound Document

A Client Talking to a Deputy

```
// Here is the interface that a server will support to provide
// information on deputies.:
interface deputy_info {
    string get_deputy_name();
};
// Here is a normal server interface without a deputy.
interface foo {
    void bah();
};
// Here is the subtype of the foo interface, that a server
// will provide if it wishes to provide information on
// deputies. This interface simply inherits from foo and from
// deputy_info
  interface foo_with_deputy_info : foo, deputy_info {
  };
// Here is the interface that a "foo" deputy server would support
// to allow the creation of foo deputy objects. Note that
// the deputy object returned by "create_foo_deputy" has the
// same type "foo" as the original target object passed as
// the argument "f" of type foo.
interface foo_deputy_maker {
    foo create_foo_deputy(foo f);
};
```

Sample Interface of Deputy Object
Figure 14

METHOD AND APPARATUS FOR DELEGATED COMMUNICATIONS IN A COMPUTER SYSTEM USING TRUSTED DEPUTIES

BACKGROUND OF THE INVENTION

FIELD OF THE INVENTION

The present invention relates to the fields of distributed computing systems, client-server computing and object oriented programming. Specifically, the present invention is a method and apparatus for providing client programs the ability to communicate with objects on unknown and untrusted servers in a safe and secure manner.

BACKGROUND

In an object oriented system, an object is a component comprising data and operations which can be invoked to manipulate the data. The operations (also called "methods") are invoked on the object by sending calls to the object. Each object has an object type that defines the operations that can be performed on objects of that type. One object type may inherit the object operations defined and implemented for other object types. For further description of object oriented design and programming techniques see "Object-oriented Software Construction" by Bertrand Meyer, Prentice-Hall 1988.

In client-server computing, typically there is a set of computers that can communicate with one another through a network connecting the computers. Some of these computers act as providers of services or functionality to other computers. The providers of a service or functionality are known as "servers", and the consumers of the service or functionality are called "clients". The client-server model also generalizes to the case where distinct programs running on the same computer are communicating with one another through some protected mechanism and are acting as providers and consumers of functionality.

In object oriented distributed systems based upon the client-server model, there exist servers that provide object oriented interfaces to their clients. These servers support objects consisting of data and the associated software for manipulating the data according to the operations permitted by this type of object. Clients may obtain access to these objects and may execute calls on them by transmitting the calls to the server. At the server these calls are executed via the software associated with the object. The results of these calls are then transmitted back to the client.

Currently, a number of companies have agreed to standardize certain object definitions and interfaces to permit the sharing of such objects with one another. One system, designed to enable participation in such inter-company sharing of objects, is called Distributed Objects Environment ("DOE"), created by Sun Microsystems, Inc.

DOE is an object-oriented system, providing remote access from clients to DOE objects. Server applications implement DOE objects. For any given DOE object, a DOE server can cream an object reference that acts as a pointer to the DOE object. A DOE object reference can be passed around between different processes on one machine or between different machines and it will still point to the original object.

When a client application at one location obtains a DOE object reference, it can send calls (method invocation requests) to the target DOE object. The target DOE object can then execute these calls, possibly updating its internal state (its data) and possibly returning some results to its caller.

The advent of such object sharing with entities which are outside of a user's direct control raises a number of security issues. For example, it is desired to allow DOE users to use objects that are scattered across large sets of machines. But it is essential to keep DOE users safe while they are doing this in order to prevent them from catching viruses or having other unpleasant consequences simply because they have used an object that is implemented on a unknown and untrusted machine.

As a partial solution to such security concerns, some servers provide secure access to their objects, so that only appropriately designated users can access the objects. These servers can associate an Access Control List (ACL) with each of their objects. This ACL will specify which particular users and groups of users are allowed which access rights to the given object. Access rights include things like read, write, execute, etc. ACLs are a well understood technology and are incorporated into operating systems such as Digital Equipment Corporation's VMS and IBM's AIX. See section 10.6 and chapter 11 of "Operating System Concepts" (3rd Ed.) by Silberschatz, Peterson and Galvin, 1991 Addison-Wesley Publishing Co.

A DOE object which has an ACL will be referenced to as a secure object. When a client application wants to talk to a secure object, it must establish an authenticated connection to the server which contains the implementation of the secure object. While establishing this connection, the client application must prove to the server which user the client application is representing. Thus for example, the client application may be representing the human user KGH. (As part of the business of logging into the client computer the human user purporting to be KGH will probably have had to provide some kind of password to the client computer.) After the authenticated connection has been established, the server will be convinced that the given connection is to an application which has been empowered to represent a given user. The server will record the name of this user and will associate this user's name with the given connection. The art of establishing authenticated connections is well understood. See for example "Authentication in Distributed Systems: Theory and Practice" by Buffer Lampson, Martin Abadi, Michael Burrows and Edward Wobber, ACM Transactions on Computer Systems, 10(4), November, 1992. The problem The normal DOE model is that clients invoke operations on remote objects. The server can require that the request be issued on an authenticated connection and can therefore validate that the client application is representing an authenticated user. The server can then perform a check to see that this authenticated user is really authorized to do the operation. The client hasn't taken any real security risks in issuing the request if it is only asking the server to update some internal state that the server owned anyway.

Unfortunately, this approach breaks down as soon as the user wants a server to perform some action that requires it to access some other secure server. For example, a user may request a client application to obtain a compound document, part of which is located on a first server and part on a second server. The first server can authenticate the requesting user and verify that the user is authorized to make the request. However if the first server then must access the second server for some data to complete the users response, the second server will normally refuse the request of the first server because the first server would not normally be on the access control list for the part of the program on the second server. The user may be on that access control list but not the first server.

This problem is referred to as the delegation problem. It occurs whenever it is necessary for a client to delegate part of its authority to a server in order to allow it to get its job done. (That is, in order to allow the first server to access a second server.) In the compound document example, if the client were prepared to delegate to the first server, the power to act in the user's name, then it would be able to access the program part in the second server and complete its mission.

Delegation by the user to a given server to act in the user's name in accessing a second server requires that users must trust lots of machines, which leaves them open to security attacks, or the users must trust only a small set of known machines, which severely limits the user's access to desirable objects. Some recent academic attempts have been made to craft a method of "limited delegation" using various cryptographic methodologies but these have been rejected as too complicated to administer successfully.

Accordingly, the present invention is an elegant and simple way to solve the problem of securely dealing with multiple untrusted servers by the use of a Deputy device to act on behalf of the user, and is more fully described below.

SUMMARY OF THE INVENTION

An apparatus and a method are disclosed whereby a client application can use a trusted "Deputy" application to execute operation calls on several servers on behalf of the client, the Deputy application being trusted by the servers, and the client thereby reducing the risk of being contaminated by granting unlimited access power to an unknown server, while at the same time being able to obtain the desired processing results regardless of the number or location of servers involved in providing the results.

A distributed operating system is disclosed which contains a client application, a number of servers and a deputy application. The deputy application can be trusted by the client application to act on behalf of the client application in executing a call on a target program, the call on the target program requiring access to program implementations on one or more of the servers, and the deputy application being able to prove to the servers that the deputy application is trusted by the original client application.

The process requires that the client locate a Deputy application which can support the client application and which can be trusted by the client, and establish this Deputy application on a trusted machine. The client then executes all calls on a target object via this trusted Deputy which can then invoke calls on several objects which may be subservient to the target object, and which several subservient objects may be located on different servers.

The Deputy application is identified by the client application at the time the client application makes a first invocation on a target object. The implementation of the target object tells the client application that a deputy application is recommended and provides an identification of the deputy application. The client then tries to locate the recommended Deputy application and determines whether the Deputy can be trusted, and if so the client application then proceeds to direct all calls to the Deputy.

The trusted Deputy application is created to reflect the public interface of the target object. This is why the deputy knows whether the target object needs to refer to subservient objects elsewhere. The implementation of the target object also creates a target object reference which points to itself and which can be passed to client applications for use in invoking calls on the target object. This target object reference is designed to contain a flag which indicates whether a Deputy is recommended for communicating with the target object. Therefore the client application checks this flag when a call is to be made on the target object. If the flag is set indicating the need for a Deputy, the client application checks to see if the client application has already located the Deputy and is using it. If so, the client application just directs the call to the deputy. If the client application has not yet located the Deputy, the client executes the first call on the target object and is given the identification of the recommended Deputy as described above.

Use of the disclosed process for using untrusted deputies as intermediaries insures that clients can execute applications that require data from a variety of unknown servers in a way which provides the desired security to the client.

DESCRIPTION OF THE DRAWINGS

The objects, features and advantages of the system of the present invention will be apparent from the following description in which:

FIG. 5 illustrates the relationship between a client application, an object reference, DOE object and an ACL.

FIG. 6 illustrates a similar configuration to that shown in FIG. 5 but illustrating the authenticated connection.

FIG. 14 illustrates an exemplary interface of a deputy object.

NOTATIONS AND NOMENCLATURE

Figure 1:
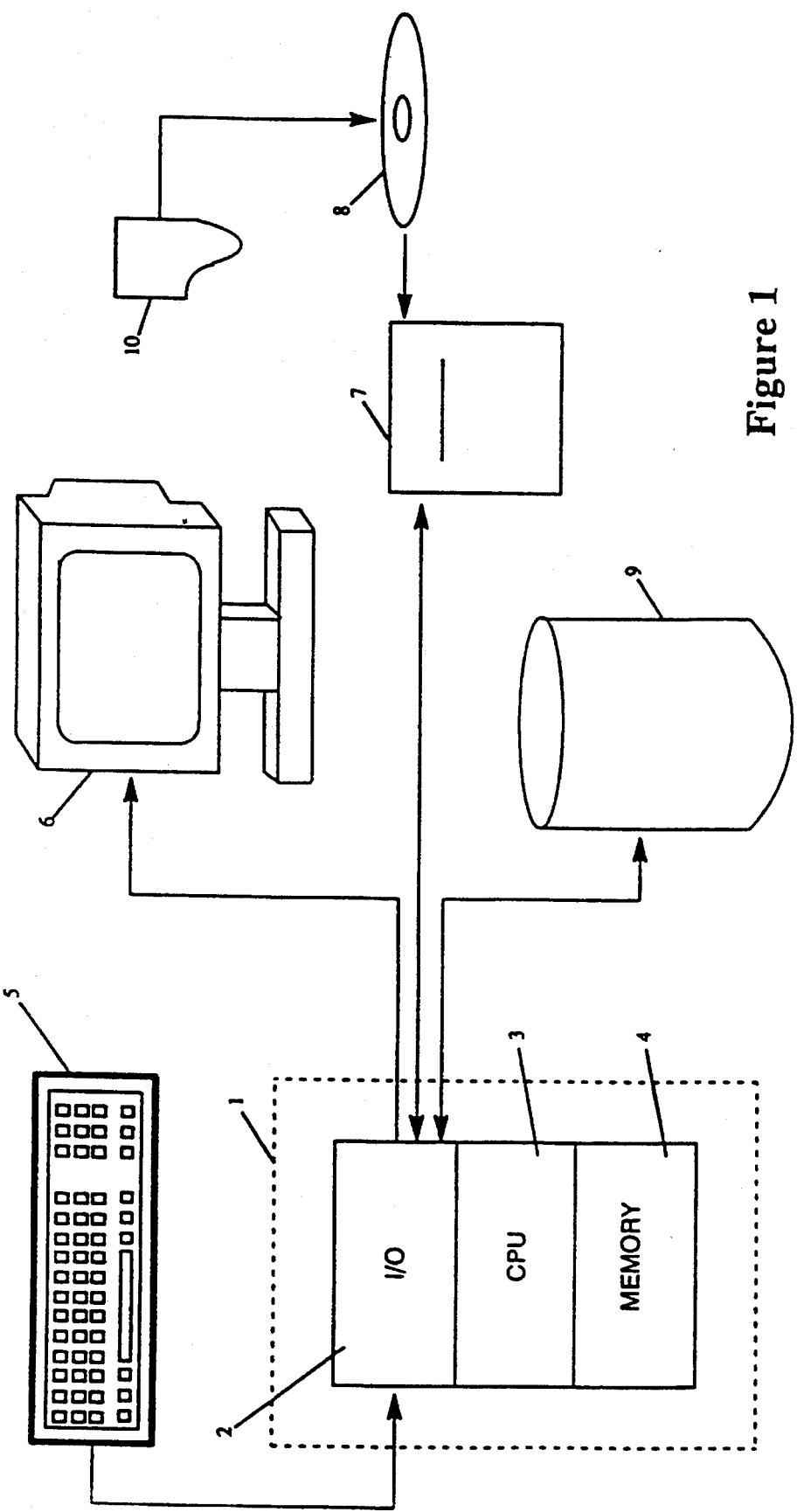
FIG. 1 illustrates a general purpose computer and related units.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

The following disclosure describes solutions to problems which are encountered in dealing with the risks which are associated with the use of objects in a widely distributed, object oriented, client-server system, in which a Deputy application is used as an intermediary between a client application and one or more servers in order to reduce the risks of contaminating either the client application or the servers. The implementation described, while it may be used in any relevant context, is an extension to the Distributed Object Environment ("DOE") system of Sun Microsystems, Inc. However, no specific knowledge of the DOE system is required by those skilled in these arts to understand and implement the process and system described in this disclosure.

The present invention discloses systems and methods for creating and using a Deputy application as an intermediary between a client application and servers which either have no reason to trust each other or otherwise will recognize only users who appear on the server applications access control list ("ACL").

Operating Environment

Figure 2:
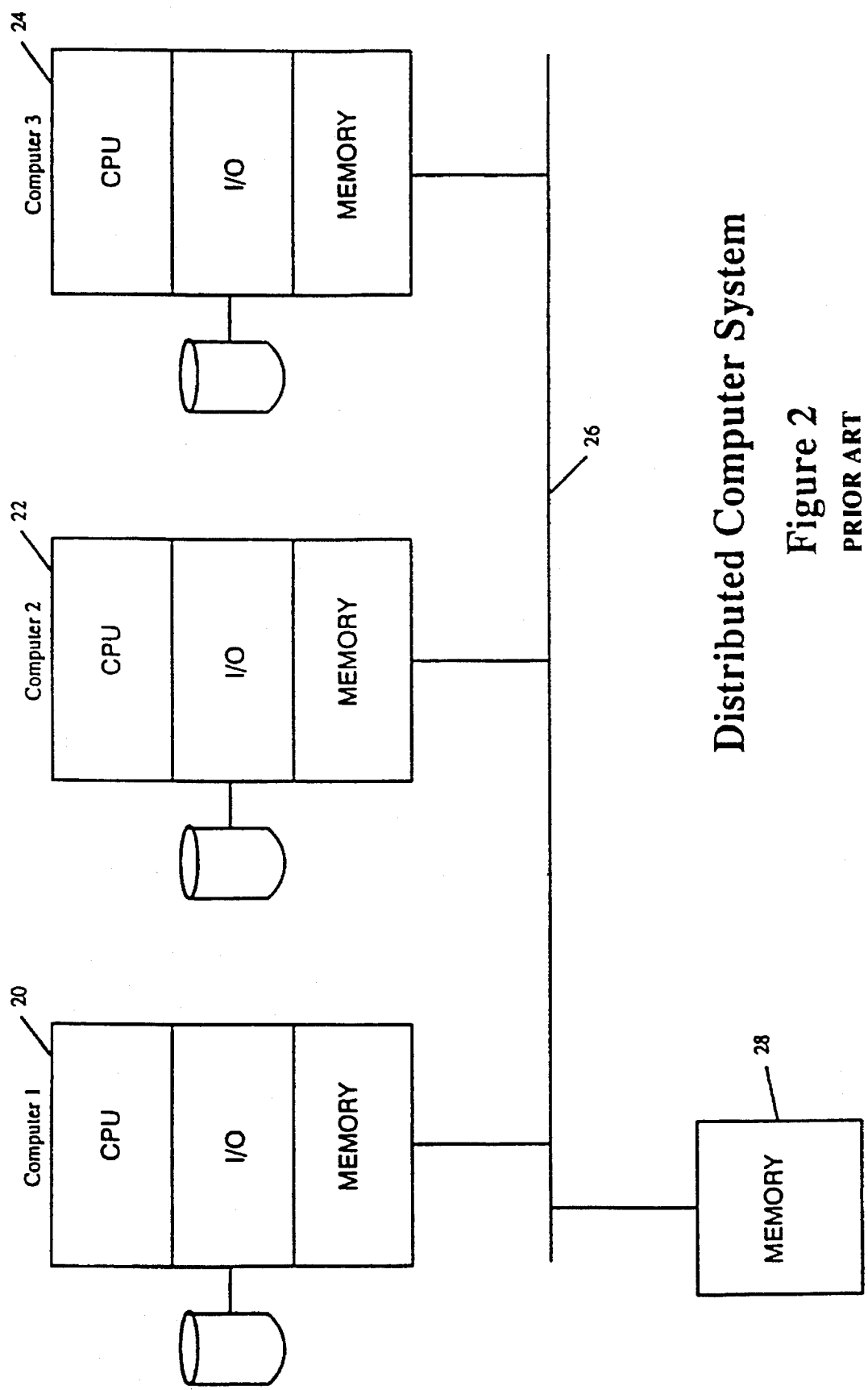
FIG. 2 illustrates a distributed computer system.
Figure 3:
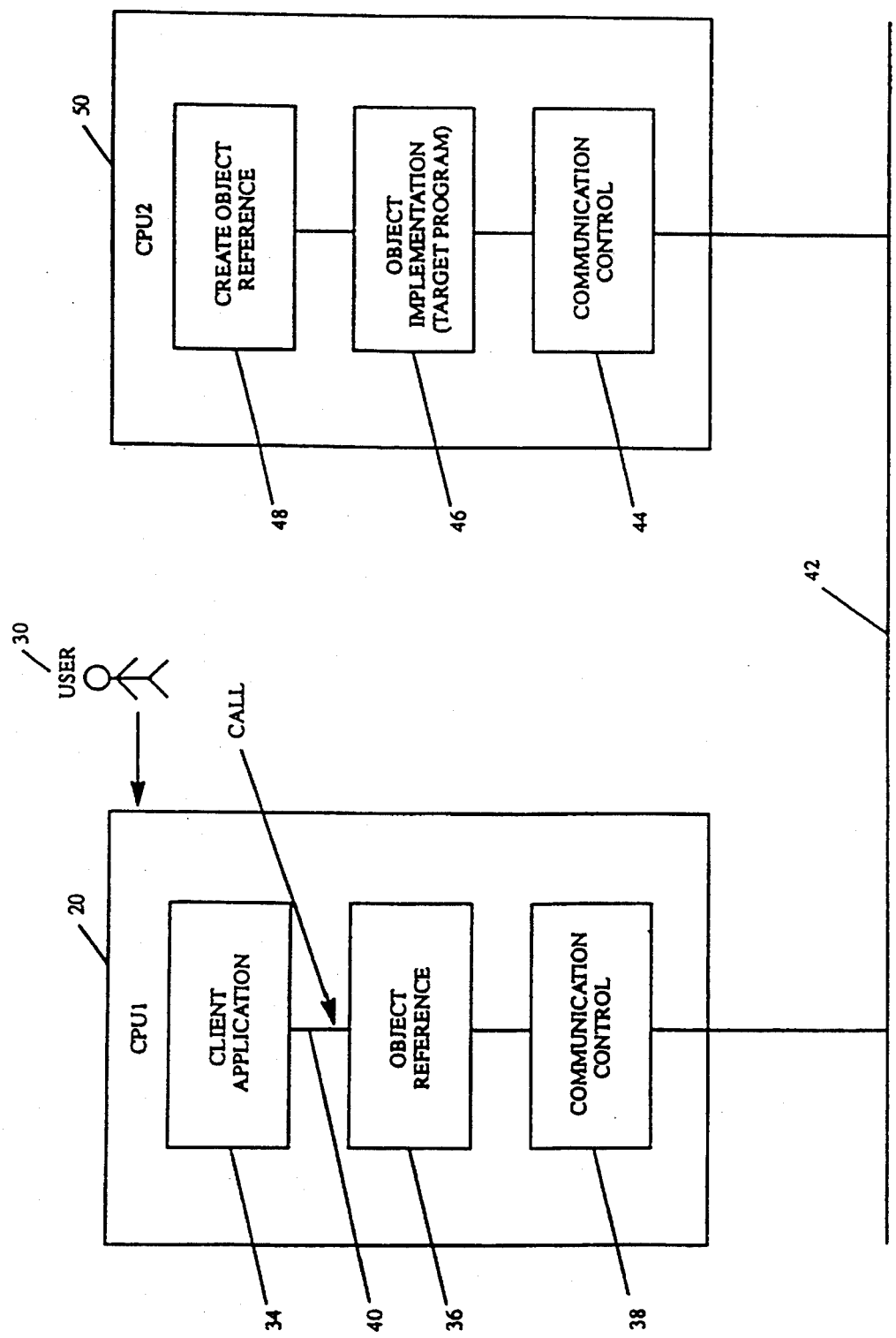
FIG. 3 illustrates a client-server system configuration with multiple machines, and illustrating the relationship of the user, client application, object reference, object implementation and create object reference program.
Figure 4:
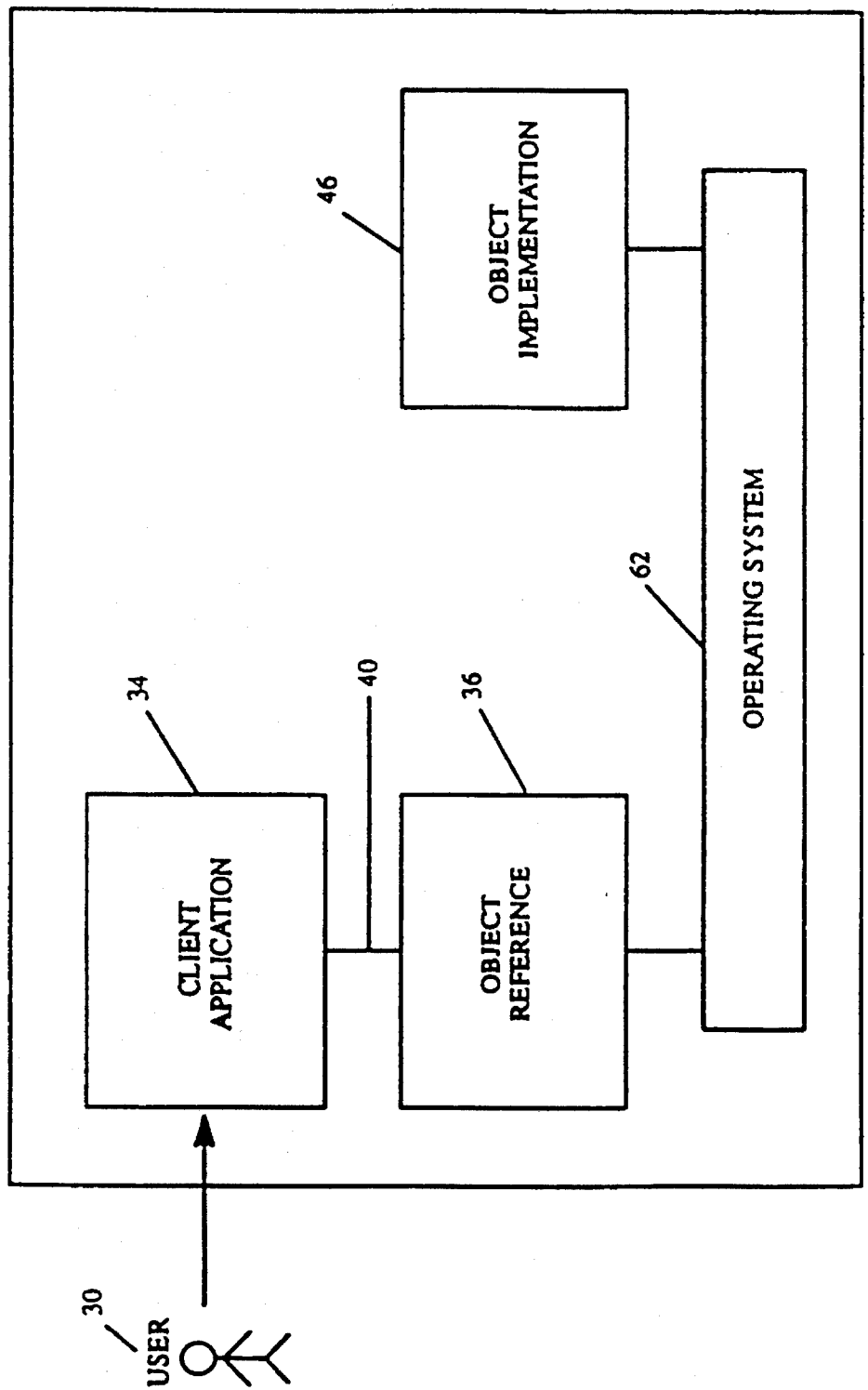
FIG. 4 illustrates a client-server configuration using a single machine.

The environment in which the present invention is used encompasses the general distributed computing system, wherein general purpose computers, workstations, or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an Input/output ("I/O") section 2, a central processing unit ("CPU") 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. FIG. 2 illustrates a typical multiprocessor distributed computer system wherein independent computers 20, 22 and 24 are connected to each other and possibly to a shared memory unit 28 via a communication link. FIG. 3 illustrates a typical object oriented, client server arrangement, wherein a user 30 can initiate a client application 34 on a first computer 32. The client application 34 places a call 40 on an object reference 36 which points to an implementation of the object (also referred to as the "target object") 46 on a second computer (the server) 50. The call 40 is passed to the communication control mechanism 38 which sends the call to the server 50 on which the object implementation 46 is located. This object implementation mechanism 46 originally creates the object reference 36 and makes it available to users. Upon completion of processing the call, the object implementation 46 will return a message or the results of a desired operation via the communication link 42 to the originating client application 34. This client-server model may also function in a single processor unit wherein the communications mechanism functions are performed by the operating system (62 in FIG. 4).

Referring now to FIG. 5, a DOE object and object reference are shown. A client application 70 may contain art object reference 72 which can point 74 to an object (also called an object implementation) 78 on a remote server 76. The object 78 may have an access control list ("ACL") 80 connected to it which tells the server 76 which users have authorized access to the object. FIG. 6 illustrates the client and server connection when a particular user (in this case KGH) 82 wishes to operate on the object 78 through the object reference 72, wherein an authorized connection 4 is needed. The client application 82 must prove to the server which user the client application 2 is representing, and the server 86 can then verify, by means of the ACL 80, that this particular user has authorized access to the object 78.

The Preferred Embodiment

The Deputies Model

The solution to the delegation problem provided by the present invention is to have object implementors split the object's functionality into two parts.

For example, an implementor who wishes to provide a deputy for the foo interface could as follows. They must implement a server application program DFOO that supports two interfaces, the original "foo" interface and the "foo_deputy_maker" interface (see FIG. 14).

When the DFOO application program is started, it must create a foo_deputy_maker object FDM and return that object to the parent application that started the DFOO application.

Thereafter, whenever there are any incoming requests on the FDM object, the DFOO application must record the argument for object "f" and create a foo deputy object DF. The original state of the DF object will simply be the "f" object.

Whenever any calls arrive on the DF object, the DFOO deputy application must implement these calls. Exactly how this is done will vary depending on the nature of the foo interface, but typically one of two routes will be taken. If the call on the DF object is a very simple operation, then the DFOO application will simply forward the call directly to the "f" object and will return whatever result "f" returns. However if the call on "DF" is a complex operation which requires that "f" accesses underlying subordinate objects, then DFOO must contact "DF" and obtain pointers to the subordinate objects. DFOO will then implement the operation by a combination of calls on these subordinate objects and of calls on the f object itself.

As before, the server application owns the object's persistent state and controls how the persistent state is made available to different clients. (An object's persistent state is the data structure which is maintained intact although the object may be stored and later retrieved.) Each object has a server, which runs in a security role that is associated with the object itself, rather than with its current clients. The server will normally perform access checks on incoming operations and has the final say in updating the object's persistent state.

The new (optional) part, which is called a Deputy application, acts as a trusted representative of a given human in dealing with a server. The deputy runs in the security role of this human. Whenever an attempt is made to talk to a remote object, the object may nominate the name of a deputy application that should run locally to manage the user's interactions with the remote server. It is then the user's responsibility to locate a suitable deputy who the user is prepared to trust, and to use this deputy as an intermediary.

This split between deputies and servers is based purely on security roles. The servers and deputies are expected to mistrust one another. A server acts as the jealous and independent guardian of an object's fundamental state, a deputy as the obedient and trusted servant of a particular user. After performing access checks, the servers may grant to the deputies some specific limited access to the underlying state, and the deputies may use the servers to provide information to the user, but it is a limited relationship based on mutual suspicion. A good deputy should never endanger its user's security without clear instructions from the user.

Based on their different security roles, it is expected that the deputies will normally run on the human user's own workstation (or on some other machine that they trust), whereas it is expected that the servers will normally run on the machine where the object's persistent state lives.

Thus, for example on a UNIX system, if a person has superuser access to a server machine he can subvert the persistent state and the servers that manipulate it, but he can't interfere with the deputies. Similarly, if a person has superuser access to a human user's workstation he will be able to use his access to get at particular objects, but he will still be limited by whatever security policies are being implemented by remote servers. The same protection would also apply on most other operating systems.

The reason for this division of labor is to allow the deputy to run with the full power and credentials of the human user, so that while operating on the remote object it can perform operations which one is not prepared to trust random servers to perform. The exact functional split between deputy and server will vary from application to application. There may be a variety of operations which have no real security consequences and could be arbitrarily lumped into either the deputy or the server.

Since it is desired to place full faith and trust in the deputies, it is important that a user be selective about which pieces of code he is prepared to run as deputies. Thus it would be expected that a user's environment would load deputies from some carefully managed search path. End-users and system administrators will need to be careful about managing this search path, so as to only include binaries from trusted hosts.

It is noted that although it is necessary to be careful about which deputies are run, the user can be fairly careless about which objects he tries to use. Whenever the user talks to an object, he will be granting the object's server no power to do him any damage. If he needs to do some special work to use an object, then the object's server may nominate a deputy that he should run locally. However the user environment will take care to only run trustworthy deputies, who will not compromise the user's security in working with remote servers.

In the present invention, this structure is advocated purely for security reasons. However, it is realized that similar separations of user interface components from underlying server functionality may be proposed for user interface purposes and it is expected that it will normally be possible to combine these two concepts, so that a trusted agent/deputy is providing a graphical user interface as well as managing secure access. Those skilled in these arts will recognize that other functionality may be combined with this trusted deputy implementation.

An example will clarify how the deputy will be expected to work. Note that a fuller description of the preferred embodiment is given below.

EXAMPLE: A Compound Document

Figure 7:
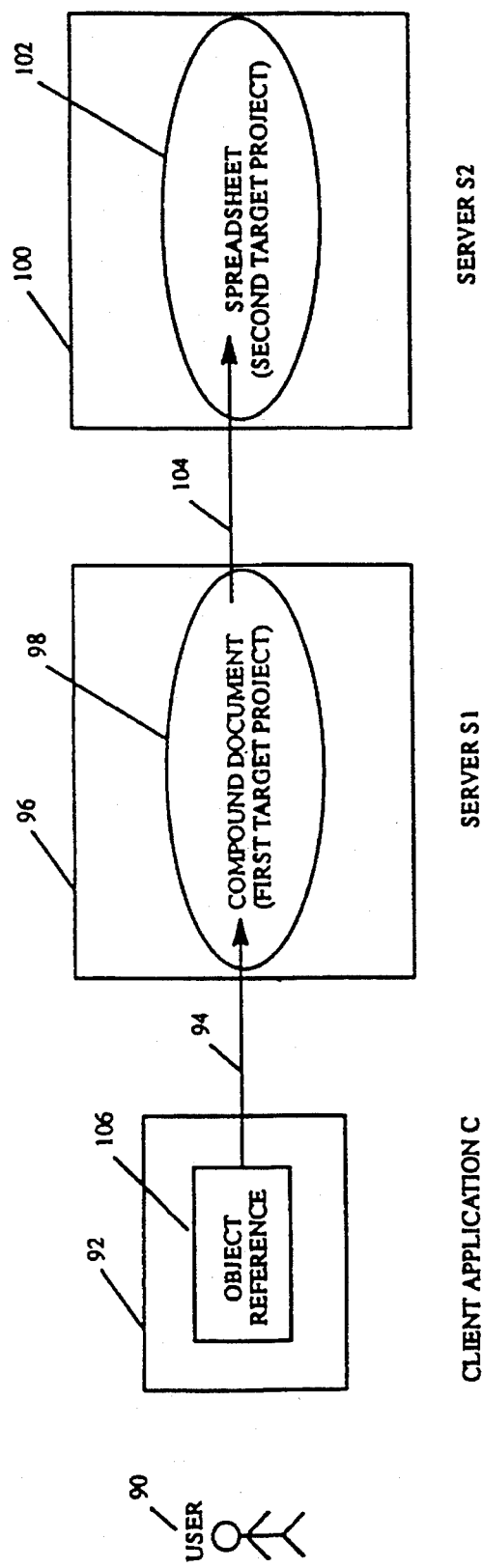
FIG. 7 illustrates a client application which requires access to multiple servers.

Referring now to FIG. 7, a user KGH 90 activates a client application 92, which invokes a call 94 using an object reference 106, on the compound document object 98 (the first target object) located on a first server 96. The compound document 98 has a certain amount of internal state, describing the layout of the document, but the bulk of its state consists of a pointer 104 to a spreadsheet (second target object) 102 located on a second server 100. The first server 96 and the second server 100 reside on different machines and (quite properly) do not trust one another. The first server 96 containing the compound document 98 is aware of the existence of the spreadsheet 102 and of how it fits into the compound document, but the first server 96 is not permitted to read the contents of the spreadsheet 102 (that is, the first server 96 is not on the ACL for the spreadsheet on the second server 100). If the client asks the compound document 98 to display its contents, it will have to mark the spreadsheet area as unknown territory because the second server 100, will not recognize a request from the first server 96.

Figure 9:
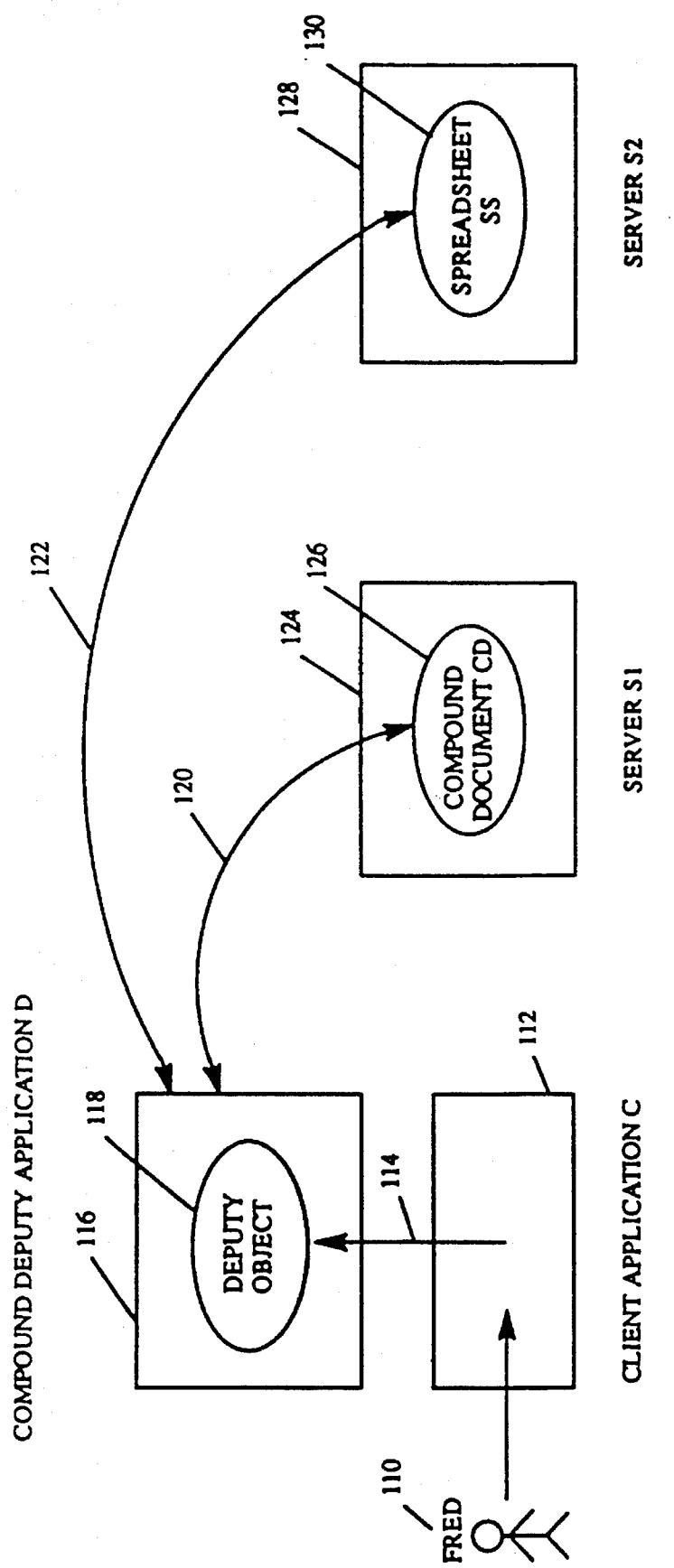
FIG. 9 illustrates a client application and the relationship of a deputy object to multiple servers.

FIG. 9 illustrates the use of a deputy application 116 which is connected to a client application 112 and individually, to the first server 124 and to the second server 128. Referring to FIG. 9, assume that some human, Fred 110, double clicks on a graphical used interface ("GUI") icon 132 representing the compound document. Fred 110 is on the access control lists for both the compound document object 126 and the spreadsheet object 130. What Fred 110 expects is to have a nicely formatted compound document appear on his screen. What he does not expect is a document with a large grey space labelled "unknown territory".

To give Fred 110 what he wants, the compound document designers provide a compound document deputy that can run on Fred's workstation. In response to Fred's double-click, his GUI attempts to contact the compound document object 126. However, the compound document object 126 replies that it needs a local deputy in order to display itself properly and says that the name of the deputy is "CompoundDeputy". The GUI 132 locates and loads the CompoundDeputy code 116, telling it to talk to the compound document object 126. So the CompoundDeputy code 116 starts running on Fred's 110 workstation with Fred's user-id, secret encryption keys and other security paraphenalia.

Now the CompoundDeputy 116 opens the compound document object 126, using an authenticated connection 120 established with Fred's security credentials. The compound document object 126 reveals the overall layout of the document and provides the pointer to the spreadsheet object 130. The CompoundDeputy 116 (acting in Fred's name) now opens the spreadsheet object 130 (again using an authenticated channel 122 opened in Fred's name.) The CompoundDeputy 116 can now combine its knowledge of the compound document object 126 and the spreadsheet object 130 to display a complete compound document on Fred's screen.

In this example, the user (Fred) 110 has not had to trust the servers 124 and 128 for either the compound document object 126 or the spreadsheet object 130. These servers 124 and 128 may or may not be on trustworthy machines. It does not matter because the compound document object 126 and the spreadsheet object 130 are still at arms length and have not been required to trust one another. Both the compound document object 126 and the spreadsheet object 130 were able to verify that their client had Fred's security credentials, and was therefore allowed access to the document. Fred 110 had to implicitly trust his GUI and the CompoundDeputy 116 it chose to run, but that came from the same trusted server as the rest of the software he runs.

Which Objects Need Deputies?

Not all objects need deputies. An object that is entirely passive and is simply a storage repository will probably not need a deputy. Similarly, an object that can perform all its duties by acting in its own name will not need a deputy. However any object which wants to be able to access other objects may need a deputy. Sometimes the other objects may normally be publicly readable (this might be common for, say, fonts), obviating the need for a deputy. But as soon as an object needs to use other objects which have restricted access, then it's likely to need a deputy, which can access these objects under the role of the real human end-user.

The Preferred Embodiment

Figure 8:
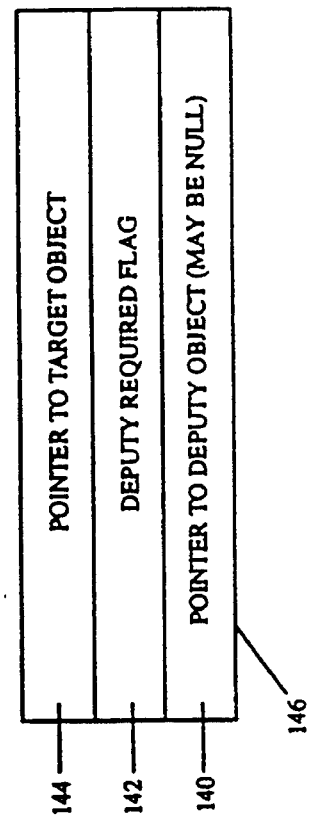
FIG. 8 illustrates the details of an exemplary target reference structure.

FIG. 8 illustrates the data contained in a DOE target object reference 146, showing a pointer to the target object 144, a "deputy required flag" 142 and other data 140. In the preferred embodiment each object reference contains a deputy required flag ("DF") that can be either true or false. If this flag is false it implies that it is not necessary to use a Deputy in order to talk to the object represented by the object reference. If the flag DF is true then it implies that it may be necessary to obtain a deputy in order to talk satisfactorily to the object represented by the object reference.

When a server creates a new object reference to point to a DOE object the server must decide whether it would be advisable for the server's clients to use Deputies to talk to the DOE object. If so, the server should set the DF flag in the object reference when it is created, otherwise it should leave the DF flag clear.

Applications can freely transmit and receive object references without checking the DF flag. However, when an application first invokes an object reference, it must check the DF flag, as described below. If an object reference has the DF flag set, then it may have associated with it a deputy object reference as described below.

Figure 11:
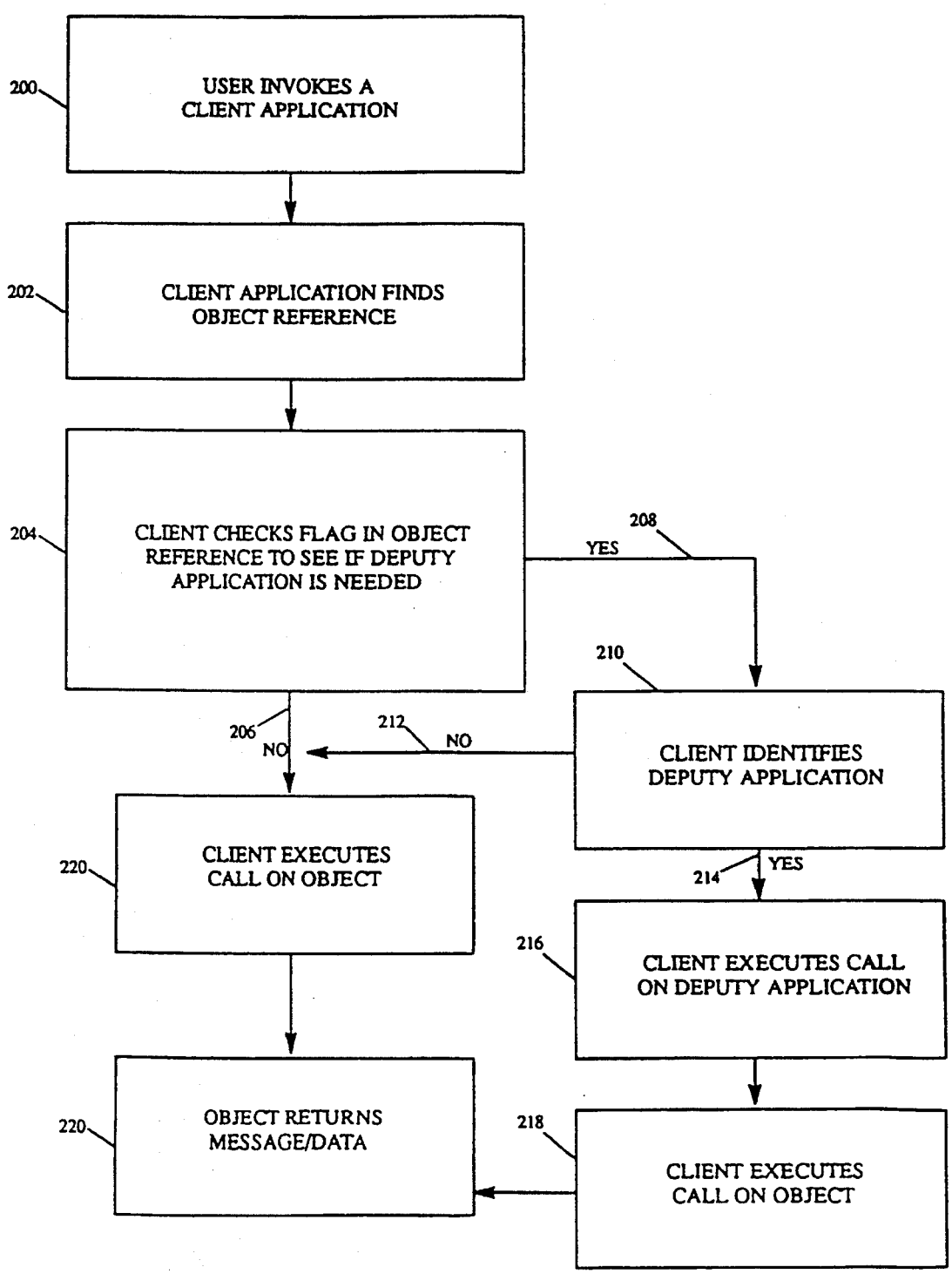
FIG. 11 illustrates the general program code mechanisms required to use a deputy application.
Figure 12:
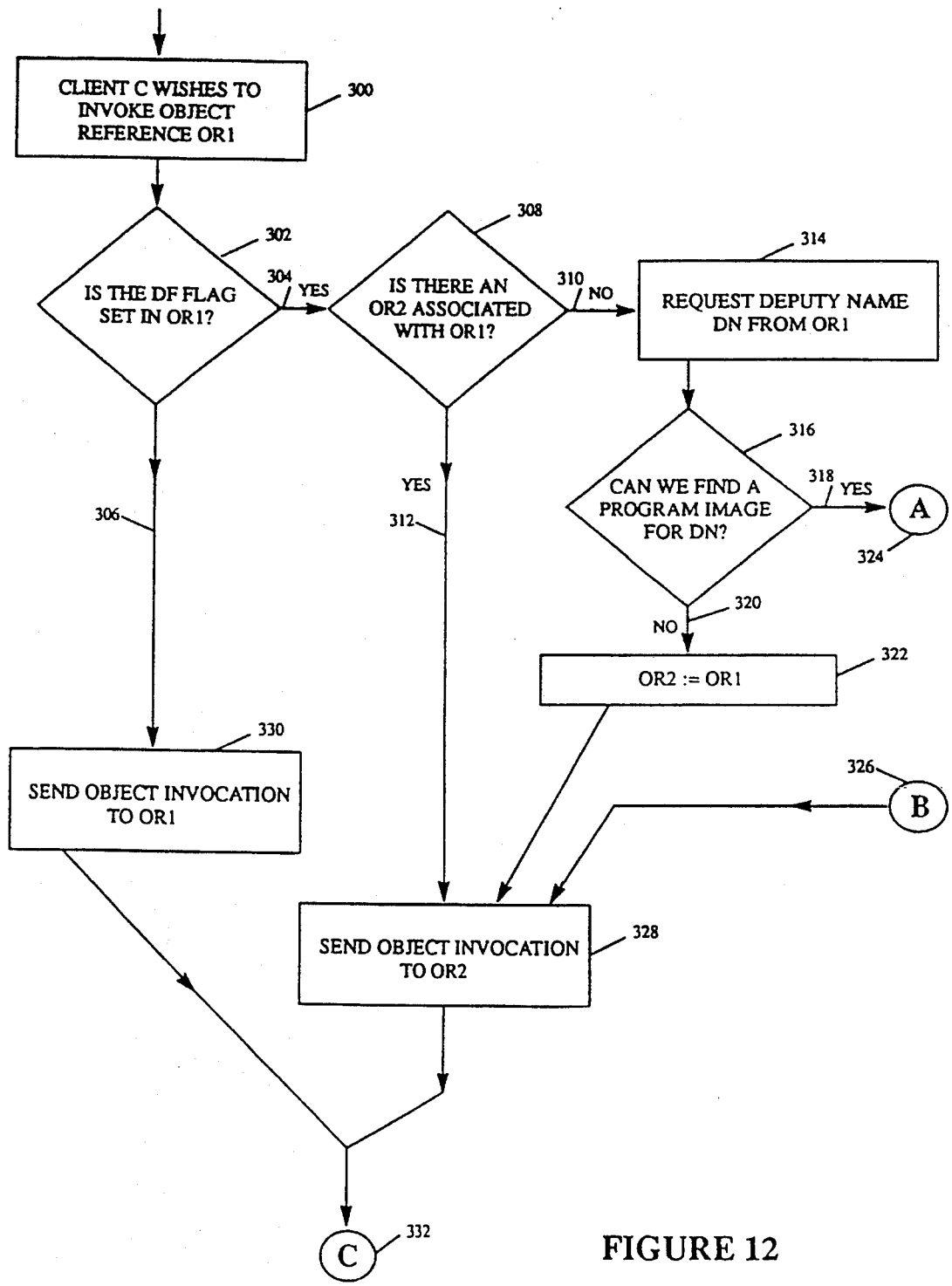
FIGS. 12 & 13 illustrate a flow chart of the system for determining whether a deputy application is required and for controlling the object references.
Figure 13:
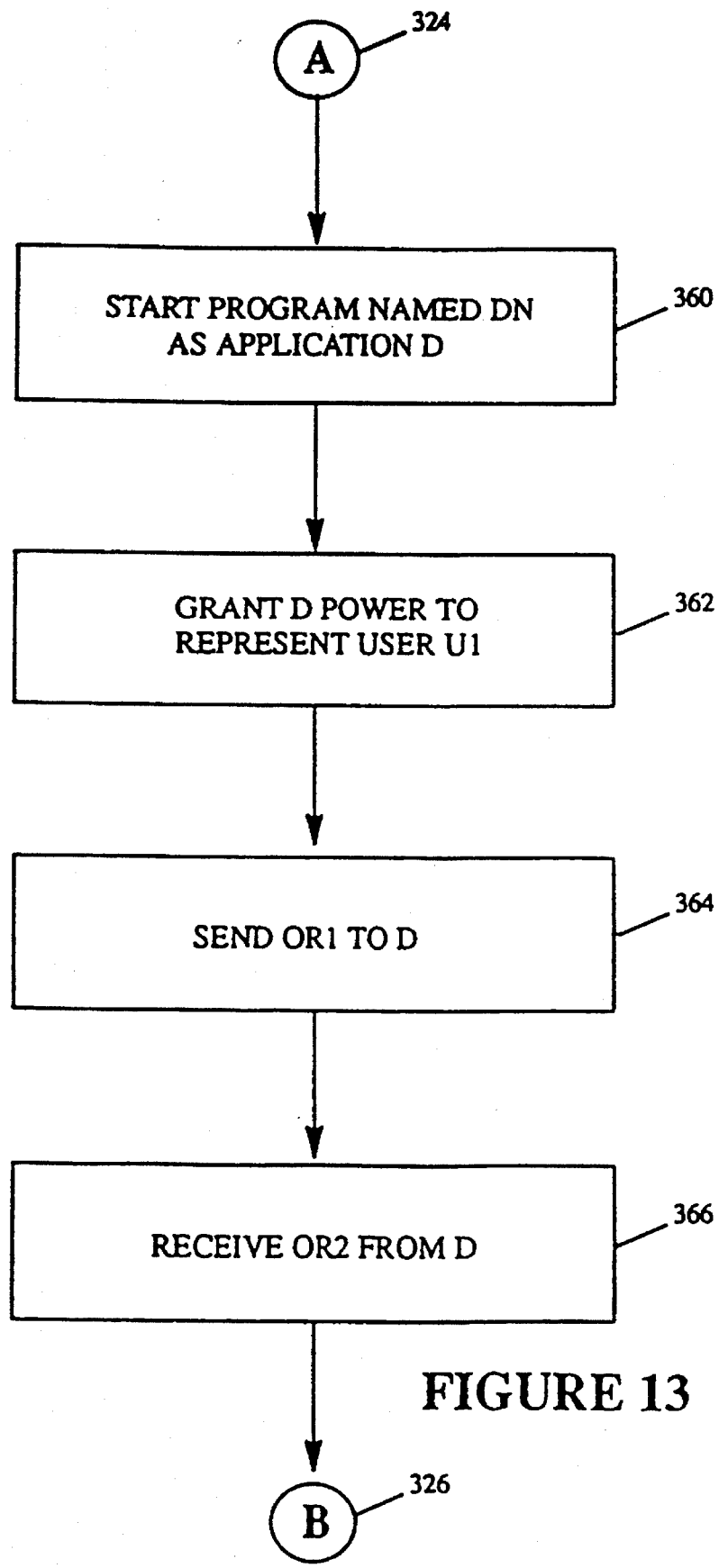

In general, the preferred embodiment for the use of the Deputy application is described in terms of the program code mechanisms shown in FIG. 11 as follows: the activity begins when a user invokes a client application 200; the client application will invoke a call on some object and to do so must find an object reference pointing to the object 202; the client application checks the deputy required flag in the object reference to see if a deputy is needed 204; if no deputy is needed 206 the client proceeds to execute the call directly on the object 220; if a deputy is needed 208 the client must identify the deputy application required and see if this deputy is available 210; if the deputy is not available 212 the client notifies the user and proceeds to execute the call on the object directly 220; if the deputy is found 214 the client executes the call on the deputy 216 and the deputy executes the call on the object 218. This process is now described in more detail with respect to FIGS. 10, 12 and 13.

Figure 10:
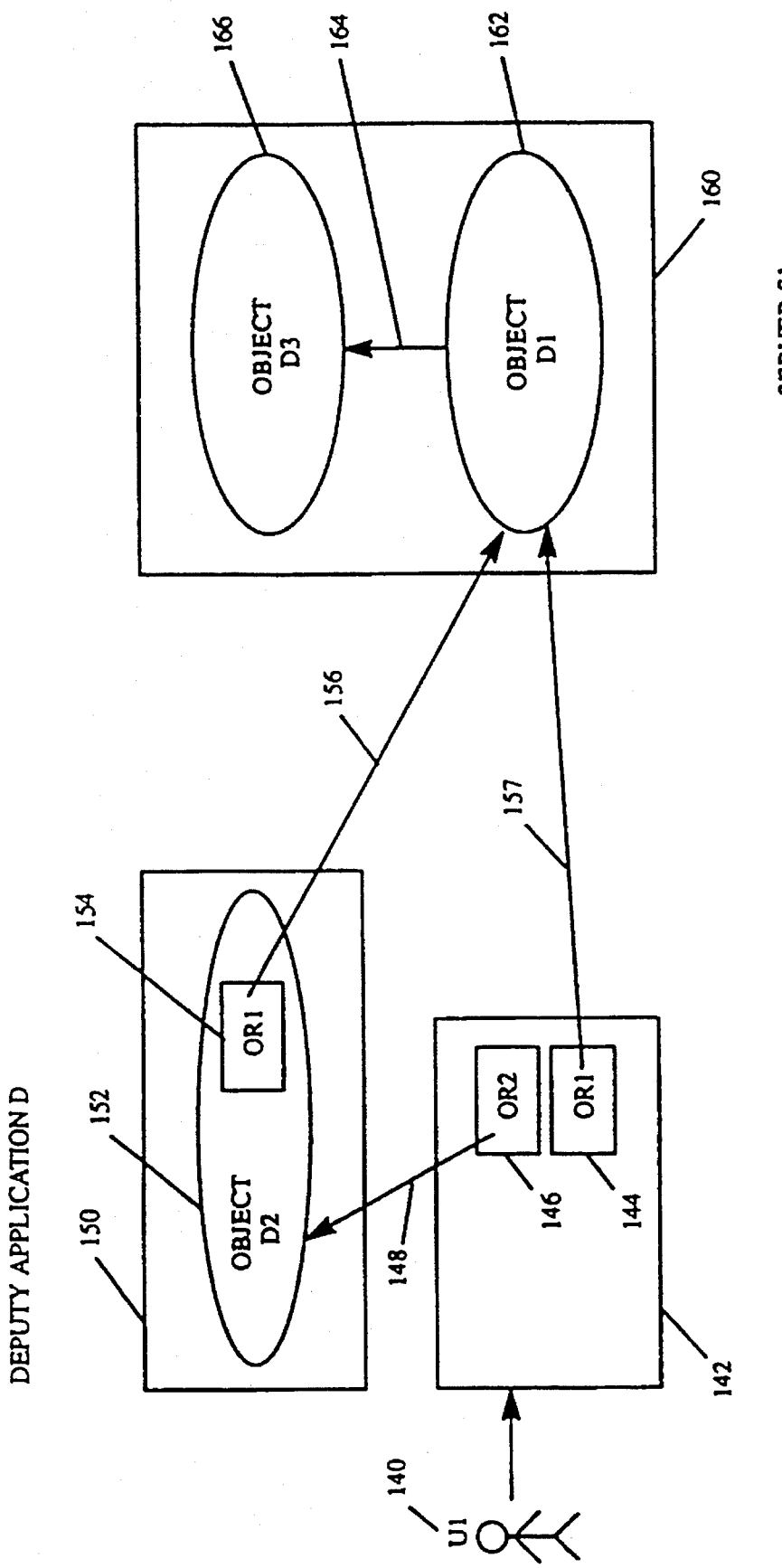
FIG. 10 illustrates a more complete deputy application usage in a multiple object context.

FIG. 10 illustrates a user 140, a client application 142 containing an object reference 144 which points to a first DOE object 162 supported on a server 160, the client application 142 also containing a deputy object reference 146 pointing at a DOE object 152 which itself contains an object reference 154 which also points to first object 162 on server 160. The first DOE object 162 points 164 to a second object 166 also on server 160. Referring to FIG. 10 the server 160 that is supporting the DOE object 162 creates art object reference OR1 144 pointing at the DOE object 162.

This object reference OR1 144 is given to a client application C 142 which is representing the user U1 140. The following description of the preferred embodiment is made in reference to FIG. 10. However the process is also shown graphically in FIGS. 12 and 13. Referring again to FIG. 10, when client application C 142 attempts an object invocation OI1 on object reference OR1 144 the client application C 142 must check to see whether object reference OR1 144 has the DF flag set.

If the DF flag is clear, then client application C 142 can proceed with the original object invocation OI1 on object reference OR1 144 and need not concern itself with deputies.

If the DF flag is set, the client application C 142 will check to see if it already has a deputy object reference OR2 146 associated with the object reference OR 1 144. If the client application C 142 does, then client application C 142 will simply send the object invocation OI1 to the deputy object reference OR2 146.

If the DF flag is set and the object reference OR 1 144 does not currently have a deputy object reference OR2 146 associated with it, then client application C 142 will send an invocation through object reference OR1 144 to DOE object D1 162 requesting the name of a deputy application. The DOE object D1 162 will return a name (for example, name "DN") for a deputy application.

The client application C 142 must then locate a suitable application program binary called DN in its environment. Client application C 142 will do this by attempting to locate the program named DN on its search path of directories holding application program binaries.

If client application C 142 fails to locate a suitable application program binary, then client application C 142 will display an error message to the user. Client application C 142 will then set object reference OR1 144 as the deputy object reference OR2 146 associated with object reference OR1 144 and send the original object invocation OI1 to object reference OR1 144. Thus the user is informed by the error message that a deputy was recommended by the object being referenced but the client could not locate an acceptable deputy and the user should understand that the client application is proceeding to send the object references directly to the object without going through a deputy and that this may result in some anomaly in the expected results (such as, the compound document with a data hole in it as described above).

If client application C 142 does locate a suitable application program binary, then client application C 142 will start that binary running as a new client application D (Deputy application D 150). Client application C 142 will pass to Deputy application D 150 the right to represent the user U1 140. On a SunOS operating system this would be handled as part of the normal UNIX "fork" mechanism for creating a child process that shares the same security profile as its creator. Those skilled in the art will recognize that there are alternative ways to accomplish this right of representation in other operating system environments.

Client application C 142 will now pass to Deputy application D 150 the object reference OR1 154 and request D 150 to act as a deputy for object reference OR1 154.

Deputy application D 150 will create a new DOE object D2 152. Deputy application D 150 will then create an object reference OR2 146 pointing at DOE object D2 152. The state of DOE object D2 152 will initially be the object reference OR1 154. The object reference OR2 146 will have the DF flag clear. Deputy application D 150 will return the object reference OR2 146 to Client application C 142.

Client application C 142 will now record the object reference OR2 146 and associate object reference OR2 146 with the object reference OR1 144 as the deputy object reference for OR1 144.

Client application C 142 will now send the original object invocation OI1 to object reference OR2 146.

A process has been described whereby a deputy application 150 is started and a deputy object D2 152 is created to act as a trusted intermediary between the client application C 142 and the original server S1 160.

Client application C 142 can now proceed to open an authenticated connection 158 to server S1 160 in user U1's 140 name and can then discover from target object D1 162 what further objects (such as possibly object D3 166) it needs to talk to and then open authenticated connections to those servers also.

From this point on Client application C 142 can send all its invocation requests to object D2 152 and can treat object D2 152 in every way as it would treat object D1 162, except that object D2152 has the power to represent user U1 140 and also has enough understanding of the structure of object D1 162 to represent the client in talking to components of object D1 162.

Although the present invention has been described with reference to particular operating systems, program code mechanisms, and object and object reference definitions, it will be appreciated by one skilled in the art that the present invention may be implemented in any one of a number of variations within a given operating environment, or in different operating system or object system environments.

Similarly, particular client and server configurations or combinations illustrated in the figures are only representative of one of many such configurations of clients and servers and object and sub-object relationships which may use the present invention. Moreover, it will be understood that the figures are for illustration only and should not be taken as limitations on the invention. Some additional combinations of the deputy/agent combination with other functions include the combining of the deputy with a Graphical User Interface ("GUI") agent that provides a friendly user interface to the target object; the combining of the deputy with an artificial intelligence agent which modifies remote requests based upon the user's known preferences; the combining of the deputy with a caching program that caches answers to remote requests; the combining of the deputy with a teleconferencing application that merges the inputs from several users and sends them to the target; or the combining of a deputy with a number of audio and video accessing agents in a multimedia system. These possible deputy/agent combination are not intended to limit in any way the possible uses of the deputy function as disclosed herein, but merely represent some examples which those skilled in these arts will recognize as merely exemplary.

What is claimed is:

1. In a distributed computer system, a method for a user to communicate safely with an untrusted server, by delegating a trusted deputy application to act in behalf of said user, said method performed by instructions in a central processor of a computer in said distributed system, said method comprising the steps of:

identifying a deputy application in a computer in said distributed computer system, said deputy application being recommended by said untrusted server to a client application, said client application checking a series of places on said client application's computer which contain indications of deputy applications to be trusted and if said recommended deputy application is recognized as trustworthy designating said recommended deputy application as a trusted deputy application to act on behalf of said client application;

executing a call on one or more target programs by invoking said call on said trusted deputy application, said call being initiated by said client application;

passing said invoked call to one or more servers which contain implementations of said one or more target programs, by said deputy application; and accepting said invoked call by said one or more servers which contain implementations of said one or more target programs by recognizing that said trusted deputy is acting for said client application regardless of which computer in said distributed computer system said trusted deputy application resides on.

2. The method of claim 1 wherein said distributed computer system is an object oriented system, said target programs are target objects and said deputy application is represented by a deputy object.

3. The method of claim 2 wherein the step of identifying a deputy application comprises the steps of:

interrogating a server which represents a target object for a name of a trusted deputy application, said interrogation being made by said client application;

locating said name of said trusted deputy application by said client application in a place containing names of deputy applications considered trustworthy by said application; and determining that said name of said trusted deputy application is among those names considered to be trusted by said client application.

4. A method for a client application in a computer system to communicate safely with one or more untrusted servers on behalf of a user, by delegating a trusted deputy application to act in behalf of said user, said method performed by instructions in a central processor in said computer system comprising the steps of:

initiating a client application, said client application being located on a first computer;

accessing a first target object by said client application, an implementation of said first target object being located on a first server;

obtaining from said implementation of said first target object an identification of a deputy application, which said first server is willing to accept independent of which machine said deputy application resides on;

locating said identified deputy application;

determining whether said client application is willing to trust said identified deputy application, said determination being made by checking said identification of said deputy application against identifications of deputy applications known to be trusted by said client application; and using said identified deputy application which has been located, if said identified deputy application is determined to be trustworthy, as one which can be trusted by said client application, to act as a trusted representative of said client application in dealing with said first server.

5. The method described in claim 4 wherein said deputy application which has been located, and which can be trusted by said client application, will run on said first computer which also contains said client application.

6. The method described in claim 4 wherein said deputy application which has been located, and which can be trusted by said client application, will run on a second computer which does not contain said client application but which is trusted by said client application.

7. The method described in claim 4 wherein said step of accessing a first target object by said client application comprises the additional step of using a first target object reference in order to access said first target object, said first target object reference containing a flag specifying whether a trusted deputy application is necessary, and if said flag indicates that a trusted deputy application is not required by the server then said first target object may be accessed directly by said client application.

8. The method described in claim 7 comprising an additional step of said client application passing security credentials to said deputy application so that said deputy application can prove to servers that said deputy application is allowed to represent said client application.

9. The method described in claim 7 wherein said deputy application, which has been located, and which can be trusted by said client application, creates a deputy object to which said client application sends subsequent calls directed at said first target object.

10. The method described in claim 9 wherein said deputy object supports an interface which is identical to an interface supported by said first target object.

11. The method described in claim 7 wherein said deputy application, which has been located, and which can be trusted by said client application, can perform operations on other servers which said first server would be unable to do because said first server acting for itself would not be trusted by other servers.

12. The method described in claim 11 wherein said deputy application, which has been located, and which can be trusted by said client application, can perform some operations that would normally be performed by said first server.

13. The method described in claim 12 wherein said deputy application, which has been located, and which can be trusted by said client application, performs the additional steps of:

obtaining one or more additional objects from said first server as a result of executing a call on said first target object as requested by said client application; and operating directly on said one or more additional objects as required to complete said call on said first target object.

14. The method described in claim 13 wherein said one or more additional objects from said first server, which are obtained as a result of executing a call on said first target object as requested by said client application, may be located on servers other than said first server.

15. A method for creating a system for use in a computer to allow a client application to communicate safely with an untrusted server, by delegating a trusted deputy application to act in behalf of said client application, said method performed by instructions in a central processor of a computer, said method comprising the steps of:

creating an object reference which points to a first target object located on a first server wherein said object reference contains a flag, said flag being coded by said computer to indicate to a client application whether or not a deputy application is recommended when invoking operations on said target object;

obtaining a deputy application if one is recommended for use with said first target object, wherein said deputy application will be accepted by a server as a representative of a client application independent of which machine said deputy application resides on;

installing said deputy application on a machine trusted by said client application and placing an identification of said deputy application in a place well known by said client application as a place containing identifications of deputy applications which are trustworthy; and using said deputy application as a trusted intermediary by said client application to invoke operations on said first target object if said flag in said object reference to said first target object indicates that use of a deputy application is recommended and if said client application is able to verify that said deputy application is trustworthy.

16. The method described in claim 15 wherein said object reference is created by a create program located on said first server, said create program determining whether said flag must be set to indicate that a deputy application is recommended from indications in an implementation program for said target object.

17. The method described in claim 16 wherein the step of using said deputy application comprises the additional steps of: checking said flag in said object reference to said first target object, when said object reference is first invoked by said client application, to determine if a deputy application is recommended;

locating said deputy application on a machine trusted by said client application if said flag indicates that said deputy application is recommended; and invoking an operation on said first target object by making said invocation on a deputy object, said deputy object being created by said deputy application.

18. The method described in claim 17 comprising the additional step of invoking an operation directly on said first target object without use of a deputy application when said flag indicates that no deputy application is recommended.

19. The method described in claim 18 comprising the additional step of invoking an operation directly on said first target object without use of a deputy application when said flag indicates that a deputy application is recommended but said recommended deputy application cannot be located on a machine trusted by said client application.

20. A computer system containing in its memory a computer program product for use in a distributed computer system for executing programs on one or more untrusted servers, said computer system comprising:

a first system element for identifying a deputy application, by said computer system, said deputy application being trusted by a client application in said computer system, said deputy application having security credentials proving that said deputy application is entitled to represent said client application; and a second system element for using said deputy application, by a client application unaware of a location of said one or more servers containing target applications, to act as a trusted intermediary in accessing said target applications wherein said one or more servers containing target applications will accept operation calls from said deputy application as representing said client application without regard to what machine said deputy application is on.

21. A distributed computer system including a plurality of servers and having a plurality of computers interconnected by a communications link, said distributed computer system comprising:

a deputy application on a first computer which deputy application can be trusted by a client application to act on behalf of said client application in executing a call on one or more target programs;

a fast target program residing on a fast server, said first server being coupled to said computer containing said deputy application, said first target program containing a reference to a second target program; and a program in said first computer for executing said call by said client application, said call being executed on said deputy application, said deputy application executing said call on said first target program and said second target program on behalf of said client application, said deputy application being trusted by said fast target program and said second target program without regard for what machine said deputy application is on, whereby said client application can access a plurality of target programs through said deputy application.

22. The system of claim 21 wherein said second target program is located on a second server that is unknown by said client application.

23. The system of claim 21 wherein said programs are object oriented system objects.

24. The system of claim 21 wherein said deputy application is located on a same machine as said client application.

25. The system of claim 21 wherein said deputy and said client application are located on different machines, both of said machines being trusted by said client application.

26. The system of claim 21 wherein said program for executing a call by said client application determines whether a deputy application is required for executing said call and if not, executes said call directly on said first target program.

27. In an object oriented system having a client application and a plurality of computers, and a plurality of servers, said plurality of servers containing one or more target object implementations, the improvement comprising:

a deputy application operating in one of said plurality of computers, which deputy application was recommended by one of said plurality of servers to said client application, said client application checking a series of places on said client application's computer which contain indications of deputy applications to be trusted and if said recommended deputy application is recognized as trustworthy designating said recommended deputy application as a trusted deputy application to act in said client application's behalf, said deputy application being trusted by one or more of said plurality of servers which originally recommended said deputy application as one which is trustworthy, without regard for what machine said deputy application is on, wherein said client application executes a call on said one or more target object implementations by invoking said call on said deputy application.

28. A distributed computer system having a plurality of computers, and a plurality of servers, said distributed computer system comprising:

a client application operating in one of said plurality of computers in said distributed computer system; and a deputy application which can be trusted by said client application to act on behalf of said client application in executing a call on a target program operating in one of said plurality of computers in said distributed computer system, wherein said call on said target program requiring access to program implementations on one or more of said servers is performed by computer instructions in one of said plurality of computers in said distributed computer system, said computer instructions representing said deputy application, and wherein said one or more of said servers trust said deputy application as representing said client application without regard to which computer said deputy application resides upon.

* * * * *